3,035,004
AQUEOUS POLYMER DISPERSIONS CONTAINING ($C_1$–$C_8$)-ALKYL ACRYLATE/METHACRYLIC ACID COPOLYMER SALT THICKENERS
Frank J. Glavis, Elkins Park, Pa., assignor to Rohm & Haas Company, Philadelphia, Pa., a corporation of Delaware
No Drawing. Original application Mar. 25, 1955, Ser. No. 496,926. Divided and this application July 31, 1957, Ser. No. 675,267
8 Claims. (Cl. 260—29.7)

This invention relates to the thickening of aqueous dispersions of water-insoluble polymeric materials of either natural or artificial origin and to the thickened dispersions thereby obtained. This application is a division of my application Serial No. 496,926, filed March 25, 1955, now abandoned.

It is a primary object of the present invention to provide polymeric materials of water-soluble character which, when dissolved in water even at high concentrations of around 20% or so, are of relatively non-viscous character so that such a concentrated solution of the thickener may be readily incorporated into aqueous dispersions that are to be thickened. Another object of the invention is to provide improved thickening agents which are at least as effective as prior thickeners in many types of such aqueous dispersions; and in certain other types of such dispersions they are adapted to impart from two to ten times the thickening effect that has heretofore been obtained with conventional products applied to this purpose commercially when incorporated into the aqueous dispersions in corresponding amounts. Further objects and advantages of the invention will be apparent from the description hereinafter.

Salts of polyacrylic acid and polymethacrylic acid have heretofore been used as thickeners in various aqueous systems. Products useful for this have also been made by the hydrolysis of esters, amides, or nitriles of acrylic acid. Generally hydrolysis of at least 60% of the acid derivative groups in the polymer was necessary to impart water-solubility to the hydrolysis product. The customary practice was to hydrolyze 70 to 90% or more of the ester, nitrile, or amide groups usually with sodium or potassium hydroxides. Hydrolysis products of this character are generally produced in concentrations of 5 to 15% in water, and because of the difficulty and expense of drying the viscous product, they are generally sold and distributed in this aqueous form. Because of the extremely high viscosity of such hydrolysis products, it has been necessary to dilute the aqueous solution thereof to a concentration of approximately 5% before the viscosity is sufficiently lowered to assure adequate miscibility thereof with the aqueous dispersion to be thickened in simple agitating and mixing equipment. Thus, in using such hydrolysis products, 19 parts of water is added for each part of the effective thickening agent during the incorporation of the 5% solution into the aqueous dispersion to be thickened. It is obvious that the use of such dilute solutions cannot be expected to produce the maximum increase in viscosity for a given weight of polymeric material.

It was heretofore thought that thickeners of this type depended for their thickening effect entirely on the polyelectrolyte content of the polymers and, hence, it was the practice in producing such products to hydrolyze substantially 70 to 90% of the hydrolyzable groups on the theory that the greater the proportion of electrically-charged carboxylic groups produced, the more effective the product would be as a thickening agent.

It has now been discovered that water-soluble salts of certain copolymers of methacrylic acid with large proportions of certain comonomers of electrically neutral character have remarkably outstanding capacities for thickening aqueous dispersions of water-insoluble polymeric materials. Comparatively speaking, whereas the incorporation of about 0.82% by weight on the dry basis of a hydrolysis product of the type mentioned hereinabove into a butadiene-styrene copolymer dispersion containing 40% solids would raise the viscosity to about 2000 to 5000 centipoises, the incorporation of the same amount of the copolymer salts of the present invention generally raises the viscosity into the range of about 10,000 to about 50,000 centipoises. At the same time, solutions of the copolymer salts of the present invention have a relatively low viscosity in water as compared to the hydrolysis products discussed above so that even at concentrations of 15 to 25% in water, the aqueous solutions are still sufficiently mobile to be readily incorporated into aqueous dispersions of water-insoluble materials that are to be thickened by simple mixing devices.

The thickening agents of the present invention are water-soluble salts of copolymers obtained by the direct polymerization of 35 to 56% by weight of methacrylic acid with 65 to 44% by weight of at least one ester of acrylic acid with an alcohol of 1 to 8 carbon atoms, at least 90% by weight of the ester being derived from one or more alcohols having 1 to 3 carbon atoms, the copolymer having a molecular weight of at least 100,000 and preferably of at least about 500,000 and being neutralized with ammonium hydroxide or a hydroxide of an alkali metal such as sodium, potassium, or lithium, or a lower amine, such as methylamine, trimethylamine, or triethanolamine. Examples of the acrylic esters are those of methanol, ethanol, propanol, isopropanol, n-butanol, sec-butanol, tert-butanol, pentanols, hexanols, cyclohexanols, and octanols. As stated, it is essential that not over 10% by weight of the monomeric esters is an ester of an alcohol having four or more carbon atoms.

Preferably, when the comonomer is ethyl acrylate or largely ethyl acrylate, the copolymer contains 41 to 53% by weight of methacrylic acid. When the comonomer is methyl acrylate or largely methyl acrylate, the copolymer preferably contains 35 to 47% by weight of methacrylic acid. When the comonomer is propyl acrylate or isopropyl acrylate or a mixture thereof or contains a large part of one or both of these esters as the major proportion of the ester component, the copolymer preferably contains 47 to 56% by weight of methacrylic acid.

Surprisingly, the salts of the methacrylic acid copolymers defined not only impart high viscosity to aqueous dispersions of water-insoluble emulsion polymers but their aqueous solutions having concentrations of 15 to 25% are still sufficiently mobile as to permit the incorporation of such a solution of the salt directly without dilution into the aqueous dispersion to be thickened. It is essential that the copolymer contain at least 35% by weight of methacrylic acid as it has been found that similar copolymers of acrylic acid are relatively non-effective for imparting high viscosity to aqueous dispersions of polymeric materials.

The copolymers of methacrylic acid and/or its salts having a molecular weight of at least 100,000 and which may have molecular weights as high as 1 million or more may be produced in an aqueous polymerization system. More particularly, the polymerization is effected in water at temperatures of 85° to 100° C. in the presence of a free radical initiator. Among the initiators that may be used are ammonium, potassium, or sodium persulfate, hydrogen peroxide, acetyl peroxide, benzoyl peroxide, tert-butyl hydroperoxide, and azo types such as azodiisobutyronitrile and dimethylazodiisobutyrate. Preferably a water-soluble initiator is used and of these the alkali metal persulfates or ammonium persulfate are preferred. The amount of initiator used may be from ½ to 3% on the weight of the monomers. Preferably, to get the maximum molecular weight, less than 1% such as 0.5 to 0.8% of the initiator is used based on the weight of the monomers. Since methacrylic acid and its salts are soluble in water, no emulsifier is needed even though the comonomer used is insoluble. However, 0.5 to 5% of a water-soluble protective colloid, based on the weight of monomers, may be used advantageously to stabilize the dispersions of the acid form of the copolymers. Such colloids may include polyvinyl alcohol, saponified polyvinyl acetates, e.g. 70% to 100% saponified, sodium alginate, methyl cellulose, sodium carboxymethyl cellulose, hydroxyethyl celluose, saponified polymers of acrylic esters, nitriles, or amides, such as polyacrylonitrile in which the nitrile groups are saponified to an extent of 70% or more, poly-(methyl acrylate) saponified to an extent of 60% or more, and ammonium, alkali metal, and amine salts of copolymers of acrylic acid or methacrylic acid with other monoethylenically unsaturated comonomers, such as acrylic esters, or the like, of which the ammonium triethanolamine or alkali metal salts of a 1:1 molar copolymer of ethyl acrylate and methacrylic acid are representative. Generally, the polymerization may be effected by first heating the water to 85° C. or higher, then adding the initiator, either partly or entirely, and adding a mixture of the monomers continuously, the mixture containing the monomers in approximately the proportion that they are desired in the ultimate copolymer obtained. Agitation by shaking or stirring is preferably effected throughout the polymerization and the heating is continued to maintain the temperature in the range of 85° to 100° C. while refluxing of any volatile monomer is maintained by means of suitable condensing equipment. This general procedure may be modified in various ways. For example, the initiator may be added in portions at successive intervals during the addition of the monomer mixture. Again, a fraction of the monomer mixture such as about ⅛ to ¹⁄₁₀ thereof may be introduced into the heated water before the initiator is added or immediately thereafter and the balance may be added continuously or in portions of comparable magnitude at intervals until copolymerization is completed. The amount of water may be selected at the beginning of the polymerization procedure with reference to the amount of comonomers to be copolymerized so that any desired concentration on the order of 15% to 25% or more of copolymer is obtained in the reaction vessel. In this case, the copolymer dispersion or suspension thereby obtained may be directly transported, or sold and shipped, to the point at which it is to be used for thickening or for other purposes. If copolymerization of methacrylic acid is resorted to, the copolymer may be neutralized before or after shipment, or shortly before use.

The methacrylic acid copolymer salts of the present invention are useful for thickening dispersions of water-insoluble polymers of all types. Besides natural rubber latex, artificial latices or aqueous dispersions of emulsion polymers of monoethylenically unsaturated vinyl or acrylic monomer types as well as other elastomeric types of polymers may be so thickened. Examples of aqueous dispersions that may be thickened include those of copolymers of styrene with butadiene (e.g., 30 mole percent styrene to 70 mole percent of butadiene), similar copolymers of acrylonitrile with butadiene, homopolymers of styrene, copolymers of 75% to 95% vinyl chloride with 5% to 25% of vinylidene chloride, acrylonitrile or vinyl acetate, polychloroprene, vinyl acetate homopolymers and copolymers, copolymers of styrene with maleic anhydride, homopolymers and copolymers of acrylic acid esters or methacrylic acid esters, such as those of alcohols having 1 to 8 carbon atoms listed hereinabove, also copolymers of the acrylic acid esters or methacrylic acid esters with vinyl chloride, vinyl acetate, acrylonitrile, styrene or the like.

The aqueous dispersions of these water-insoluble polymers may contain emulsifiers of any type including anionic, non-ionic, or cationic emulsifiers. Suitable anionic emulsifiers that may be present include the higher fatty alcohol sulfates such as the sodium or potassium salts of the sulfates of alcohols having from 8 to 18 carbon atoms such as lauryl alcohol, alkali metal salts or amine salts of higher fatty acids such as those of fatty acids having from 8 to 18 carbon atoms with sodium, potassium, or any of the ethanolamines, such as triethanolamine, examples of which include triethanolamine oleate or stearate, sulfonated compounds such as turkey red oil or sulfonated ricinoleic acid, and sulfonated alkylaryl compounds, such as sodium tert-octyl benzene sulfonate and sodium tert-octylphenol sulfonate. Examples of non-ionic emulsifiers include alkylphenoxypolyethoxyethanols having alkyl groups of about seven to eighteen carbon atoms and about 9 to 30 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing the required proportion of ethylene oxide with nonyl, dodecyl, tetradecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil; ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, etc.

Examples of cationic emulsifiers include lauryl pyridinium chloride, octylbenzyltrimethylammonium chloride, dodecyl trimethylammonium chloride, and so on.

As compared to the production of hydrolyzed thickening agents of the type mentioned hereinabove, the production of the copolymers of the present invention have the advantages of increasing kettle capacity since aqueous solutions of the copolymers of the present invention can be produced in higher concentrations than the hydrolysis products. The polymer producer, if separate from the consumer who used the polymer for thickening, saves on packaging and shipping costs because of the higher concentration in which the polymers of the present invention can be produced and the consumer benefits by the fact that no dilution is needed even when he receives an aqueous solution containing from 15% to 25% by weight of the methacrylic acid polymer or salt of the present invention. Hence, he obtains more effective thickening because of the correspondingly lesser amount of water that must be incorporated with the thickener when the aqueous solution thereof is added to the aqueous dispersion to be thickened. The fairly concentrated aqueous solutions of the methacrylic acid copolymer salts of the present invention are generally clear or slightly turbid and in this respect they have an advantage over the hydrolysis products referred to above which are generally extremely turbid and often practically opaque even at 5% concentration in water.

In the following examples, which are illustrative of the invention, the parts or percentages are by weight unless otherwise noted:

EXAMPLE 1

(a) A 5-liter flask was charged with 3100 grams of water and was equipped with a reflux condenser, dropping funnel, immersion thermometer and a stainless steel agitator. A monomer mixture was made by mixing 516 grams of glacial methacrylic acid with 604 grams of ethyl acrylate. The flask was immersed in a heated water bath and, when the temperature of the batch in the flask reached 86° C., 160 grams of the monomer mixture was added. Four minutes later a solution of 4 grams of ammonium persulfate in 50 grams of water was added and then the continuous addition of monomer was begun. The temperature rose and refluxing began. A temperature of 95° C. was reached about 10 minutes after the continuous addition of monomer was begun. About 13 minutes later a solution of 4 grams of ammonium persulfate in 59 grams of water was added at which time all but about 480 grams of the monomer mixture had been added. About 20 minutes later the monomer addition was completed and half an hour later cooling was applied. About 20 minutes later 440 ml. of 28% ammonia was added. The ammonia caused a temperature rise. After being allowed to stir for 30 minutes and to cool to room temperature, the batch was filtered. The resulting solution contained 22.5% solids and, when diluted to a 5% concentration in water, had a viscosity of 150 centipoises and a pH of 8.7.

(b) The addition of 13.3 grams of the 5% aqueous solution of part (a) hereof to 200 grams of a synthetic rubber latex of a copolymer of about 50% by weight of butadiene and 50% by weight of styrene having a solids content of 40% and an initial viscosity of 25 centipoises elevated the viscosity to 36,000 centipoises. This amounts to 0.82% by weight of the ammonium salt of the copolymer of methacrylic acid and ethyl acrylate copolymer (50:50 mole ratio).

EXAMPLE 2

(a) A monomer mixture is prepared of 65 grams of methyl acrylate with 35 grams of methacrylic acid. Ten percent of this monomer mixture is added to 850 grams of water previously heated to 90° C. while agitating. Then a solution of 0.35 gram of ammonium persulfate in 25 grams of water was added while agitating. Agitation and heating were continued and after refluxing ceased the rest of the monomer mixture was added gradually over a period of 40 minutes. When approximately ½ of the remaining monomer mixture had been added, 0.35 gram of ammonium persulfate in 25 grams of water was added. The batch was stirred another half hour while heating at 90° C. It was cooled to about 50° C., neutralized with a stoichiometric amount of ammonium hydroxide to a pH of about 8.5, 30 cc. of 28% ammonia being required. The product was obtained as a solution containing 9.36% of the copolymer salt. A 5% solution of this salt had a viscosity of 200 centipoises.

(b) The addition of 13.3 grams of the 5% aqueous solution of the copolymer salt to 200 grams of the 40% solids synthetic rubber latex of Example 1(b) resulted in raising the viscosity to 11,000 centipoises.

EXAMPLE 3

A copolymer salt of ethyl acrylate and 44 mole percent of methacrylic acid was prepared as in Example 1(a). When 0.82% of the resulting copolymer salt was introduced into a butadiene-styrene dispersion of the same composition as in Example 1(b), the dispersion was thickened to a viscosity of 13,400 centipoises.

EXAMPLE 4

A copolymer salt of ethyl acrylate with 56 mole percent of methacrylic acid was prepared as in Example 1(a). The addition of 0.82% of this copolymer salt to the butadiene-styrene dispersion of Example 1(b) thickened the dispersion to 14,400 centipoises.

EXAMPLE 5

A copolymer salt of propyl acrylate and 60 mole percent of methacrylic acid was prepared as in Example 2(a). The 5% aqueous solution of the resulting copolymer salt had a viscosity of 500 centipoises. When 0.82% of the copolymer salt was added to the butadiene-styrene dispersion of Example 1(b), the viscosity was raised to 28,000 centipoises.

EXAMPLE 6

A copolymer salt of 30 mole percent of methyl acrylate with 30 mole percent of ethyl acrylate and 40 mole percent methacrylic acid was prepared as in Example 2(a). A 5% aqueous solution of the resulting copolymer salt had a viscosity of 100 centipoises. The addition of 0.82% of the copolymer salt to the butadiene-styrene dispersion of Example 1(b) raised the viscosity to 16,000 centipoises.

EXAMPLE 7

A copolymer salt of 27.5 mole percent methyl acrylate with 27.5 mole percent ethyl acrylate and 45 mole percent methacrylic acid was prepared as in Example 2(a). A 5% aqueous solution of the resulting copolymer salt had a viscosity of 100 centipoises. The addition of 0.82% of the copolymer salt to the butadiene-styrene dispersion of Example 1(b) raised the viscosity to 15,000 centipoises.

EXAMPLE 8

A copolymer salt of 20 mole percent of propyl acrylate with 20 mole percent of ethyl acrylate and 60 mole percent of methacrylic acid was prepared as in Example 2(a). The 5% aqueous solution of this copolymer salt had a viscosity of 250 centipoises. The addition of 0.82% by weight of the copolymer salt to the butadiene-styrene dispersion of Example 1(b) raised the viscosity to 40,000 centipoises.

EXAMPLE 9

A copolymer salt of 2 mole percent of ethylhexyl acrylate with 38 mole percent of ethyl acrylate and 60 mole percent of methacrylic acid was prepared as in Example 2(a). The 5% aqueous solution of the resulting copolymer salt had a viscosity of 250 centipoises and the addition of 0.82% of the copolymer salt to the butadiene-styrene dispersion of Example 1(b) raised the viscosity to 38,000 centipoises.

EXAMPLE 10

Table A lists a number of polymer dispersions, giving the approximate weight percentages of comonomers when a copolymer is involved, the concentration (percent solids) of the polymer in the dispersion, the percent by weight (based on weight of dispersed polymer) of thickener added, and the viscosity obtained. In all cases, the thickener was added as a 5% aqueous solution and consisted of the ammonium salt of a copolymer of 50 mole percent of ethyl acrylate with 50 mole percent of methacrylic acid prepared as in Example 1(a).

Table A

| Polymer Dispersed | Con., percent Solids | Thickener, percent | Viscosity, Centipoises |
|---|---|---|---|
| 60 styrene/40 butadiene | 40.2 | 1 | 1,900 |
| 90 styrene/10 butadiene | 38.6 | 1 | 2,250 |
| 45 styrene/55 butadiene | 42 | 1 | 2,600 |
| 30 styrene/70 butadiene | 42.4 | 1 | 5,500 |
| 50 styrene/50 butadiene | 35 | 1 | 32,900 |
| styrene | 36.7 | 0.5 | 24,100 |
| 30 acrylonitrile/70 butadiene | 45 | 1 | 3,780 |
| 85 vinyl chloride/15 vinylidene chloride | 41.6 | 0.5 | 7,380 |
| chloroprene | 42.4 | 1 | 3,720 |
| 80 vinyl acetate/20 vinyl chloride | 47.1 | 0.5 | 2,800 |
| 85 vinyl acetate/15 vinyl chloride | 45 | 2 | 2,380 |
| 66 ethyl acrylate/33 methyl methacrylate/1 methacrylic acid | 39 | 1 | 2,600 |

EXAMPLE 11

A 1:1 molar ratio copolymer of ethyl acrylate and methacrylic acid, as the ammonium salt, was prepared according to Example 1(a). The aqueous solution of the copolymer salt contained 22.5% solids. Three grams of the solution were added directly to 200 grams of the 40% solids suspension of a styrene/butadiene copolymer of Example 1(b). The solution obtained a viscosity of 76,000 centipoises. The thickened dispersion was applied to the back face of a rug and dried. The coated rug was free of any tendency to slip when placed on a varnished oak floor.

The copolymer salts of the present invention may be used to make relatively thin polymeric dispersion of water-insoluble polymers into extremely viscous materials adapted to be applied as adhesives or rug backings. For this purpose, as little as 1% by weight of the copolymers or salts of the present invention is generally adequate whereas an addition of 5% to 10% of conventional thickeners would be required to provide comparable increase in viscosity. To obtain extremely high viscosities in such polymeric dispersions, ½% to 20% of the thickening polymers of the present invention may be employed. To obtain thickening but to lower viscosity as little as 0.1 to 0.5% of the thickening agents of the present invention may be added to dispersions of water-insoluble polymers. Generally, the solids of the polymer dispersion to be thickened may be from 10% to 60% by weight.

The use of the thickeners of the present invention to obtain controlled viscosities is adapted to provide compositions which are useful for dip-coating, and painting as in the case of water-base paints. For example, the addition of relatively small amounts of thickeners of the present invention may be used to provide lower ranges of viscosities up to 2,000 centipoises adapted to be used for coating purposes whereas larger proportions may be used to provide extreme viscosities useful for adhesives, rug backings, and so forth.

It is to be understood that changes and variations may be made without departing from the spirit and scope of the invention as defined in the appended claims.

I claim:

1. A composition comprising an aqueous dispersion containing 10 to 60% by weight of a water-insoluble addition polymer selected from the group consisting of natural rubber and synthetic addition polymers as defined herein and containing, as a thickening agent, from 0.1 to 2%, on the weight of the water-insoluble polymer, of a water-soluble salt of a copolymer of 35 to 56% by weight of methacrylic acid and 65 to 44% by weight of at least one ester of acrylic acid with a saturated alcohol having from 1 to 8 carbon atoms, at least 90% of the ester component consisting of at least one saturated alcohol having from 1 to 3 carbon atoms, said copolymer having a molecular weight of at least 100,000, and the synthetic addition polymers being selected from the group consisting of homopolymers of a member consisting of styrene, vinyl acetate, chloroprene, esters of acrylic acid with saturated alcohols having 1 to 8 carbon atoms, and esters of methacrylic acid with saturated alcohols having 1 to 8 carbon atoms, copolymers of styrene and butadiene, copolymers of acrylonitrile and butadiene, copolymers of vinyl chloride and a member selected from the group consisting of vinylidene chloride, acrylonitrile, and vinyl acetate, copolymers of styrene and maleic anhydride, copolymers of at least two members selected from the group consisting of acrylic acid esters and methacrylic acid esters with saturated alcohols having 1 to 8 carbon atoms, and copolymers of at least one member selected from the group consisting of acrylic acid esters and methacrylic acid esters with saturated alcohols having 1 to 8 carbon atoms with a member selected from the group consisting of vinyl chloride, vinyl acetate, acrylonitrile, styrene, and methacrylic acid.

2. A composition comprising an aqueous dispersion containing 10 to 60% by weight of a water-insoluble addition polymeric substance selected from the group consisting of natural rubber and synthetic addition polymers as defined herein, said dispersion containing, as a thickener therefor, 0.1 to 2% by weight, on the weight of the water-insoluble polymeric susbtance, of a water-soluble salt of a copolymer of 59 to 47% by weight of ethyl acrylate and 41 to 53% by weight of methacrylic acid, said copolymer having a molecular weight of at least 100,000 and the synthetic addition polymers being selected from the group consisting of homopolymers of a member selected from the group consisting of styrene, vinyl acetate, chloroprene, esters of acrylic acid with saturated alcohols having 1 to 8 carbon atoms, and esters of methacrylic acid with saturated alcohols having 1 to 8 carbon atoms, copolymers of styrene and butadiene, copolymers of acrylonitrile and butadiene, copolymers of vinyl chloride and a member selected from the group consisting of vinylidene chloride, acrylonitrile, and vinyl acetate, copolymers of styrene and maleic anhydride, copolymers of at least two members selected from the group consisting of acrylic acid esters and methacrylic acid esters with saturated alcohols having 1 to 8 carbon atoms, and copolymers of at least one member selected from the group consisting of acrylic acid esters and methacrylic acid esters with saturated alcohols having 1 to 8 carbon atoms with a member selected from the group consisting of vinyl chloride, vinyl acetate, acrylonitrile, styrene, and methacrylic acid.

3. A composition comprising an aqueous dispersion containing 10 to 60% by weight of a water-insoluble addition polymeric material selected from the group consisting of natural rubber and synthetic addition polymers as defined herein, said dispersion containing, as a thickener therefor, 0.1 to 2% by weight, on the weight of the water-insoluble polymeric substance, of a water-soluble salt of a copolymer of 65 to 53% by weight of methyl acrylate and 35 to 47% by weight of methacrylic acid, said copolymer having a molecular weight of at least 100,000, and the synthetic addition polymers being selected from the group consisting of homopolymers of a member selected from the group consisting of styrene, vinyl acetate, chloroprene, esters of acrylic acid with saturated alcohols having 1 to 8 carbon atoms, and esters of methacrylic acid with saturated alcohols having 1 to 8 carbon atoms, copolymers of styrene and butadiene, copolymers of acrylonitrile and butadiene, copolymers of vinyl chloride and a member selected from the group consisting of vinylidene chloride, acrylonitrile, and vinyl acetate, copolymers of styrene and maleic anhydride, copolymers of at least two members selected from the group consisting of acrylic acid esters and methacrylic acid esters with saturated alcohols having 1 to 8 carbon atoms, and copolymers of at least one member selected from the group consisting of acrylic acid esters and methacrylic acid esters with saturated alcohols having 1 to 8 carbon atoms with a member selected from the group consisting of vinyl chloride, vinyl acetate, acrylonitrile, styrene, and methacrylic acid.

4. A composition comprising an aqueous dispersion containing 10 to 60% by weight of a water-insoluble addition polymeric substance selected from the group consisting of natural rubber and synthetic addition polymers as defined herein, said dispersion containing, as a thickener therefor, 0.1 to 2% by weight, on the weight of the water-insoluble polymeric substance, of a water-soluble salt of a copolymer of methyl acrylate, ethyl acrylate, and 35 to 56% by weight of methacrylic acid, said copolymer having a molecular weight of at least 100,000, and the synthetic addition polymer being selected from the group consisting of homopolymers of a member selected from the group consisting of styrene, vinyl acetate, chloroprene, esters of acrylic acid with saturated alcohols having 1 to 8 carbon atoms, and esters of methacrylic acid with saturated alcohols having 1 to 8 carbon atoms, copolymers of styrene and butadiene, copolymers of acrylonitrile and butadiene, copolymers of vinyl chloride and a member selected from the group consisting of vinylidene chloride, acrylonitrile, and vinyl acetate, copolymers of styrene and maleic anhydride, copolymers of at least two members selected from the group consisting of acrylic acid esters and methacrylic acid esters with saturated alcohols having 1 to 8 carbon atoms, and copolymers of at least one member selected from the group consisting of acrylic acid esters and methacrylic acid esters with saturated alcohols having 1 to 8 carbon atoms with a member selected from the group consisting of vinyl chloride, vinyl acetate, acrylonitrile, styrene, and methacrylic acid.

5. A composition comprising an aqueous dispersion containing 10 to 60% by weight of a water-insoluble addition polymeric substance selected from the group consisting of natural rubber and synthetic addition polymers as defined herein, said dispersion containing, as a thickener therefor, 0.1 to 2% by weight, on the weight of the water-insoluble polymeric substance, of a water-soluble salt of a copolymer of propyl acrylate, ethyl acrylate, and 35 to 56% by weight of methacrylic acid, said copolymer having a molecular weight of at least 100,000, and the synthetic addition polymers being selected from the group consisting of homopolymers of a member selected from the group consisting of styrene, vinyl acetate, chloroprene, esters of acrylic acid with saturated alcohols having 1 to 8 carbon atoms, and esters of methacrylic acid with saturated alcohols having 1 to 8 carbon atoms, copolymers of styrene and butadiene, copolymers of acrylonitrile and butadiene, copolymers of vinyl chloride and a member selected from the group consisting of vinylidene chloride, acrylonitrile, and vinyl acetate, copolymers of styrene and maleic anhydride, copolymers of at least two members selected from the group consisting of acrylic acid esters and methacrylic acid esters with saturated alcohols having 1 to 8 carbon atoms, and copolymers of at least one member selected from the group consisting of acrylic acid esters and methacrylic acid esters with saturated alcohols having 1 to 8 carbon atoms with a member selected from the group consisting of vinyl chloride, vinyl acetate, acrylonitrile, styrene, and methacrylic acid.

6. A composition comprising an aqueous dispersion containing 10 to 60% by weight of a water-insoluble addition polymeric substance selected from the group consisting of natural rubber and synthetic addition polymers as defined herein, said dispersion containing, as a thickener therefor, 0.1 to 2% by weight, on the weight of the water-insoluble polymeric substance, of a water-soluble salt of a copolymer of 2-ethylhexyl acrylate, ethyl acrylate, and 35 to 56% by weight of methacrylic acid, the ethyl acrylate being at least 90% by weight of the ester component of the copolymer, said copolymer having a molecular weight of at least 100,000, and the synthetic addition polymers being selected from the group consisting of homopolymers of a member selected from the group consisting of styrene, vinyl acetate, chloroprene, esters of acrylic acid with saturated alcohols having 1 to 8 carbon atoms, and esters of methacrylic acid with saturated alcohols having 1 to 8 carbon atoms, copolymers of styrene and butadiene, copolymers of acrylonitrile and butadiene, copolymers of vinyl chloride and a member selected from the group consisting of vinylidene chloride, acrylonitrile, and vinyl acetate, copolymers of styrene and maleic anhydride, copolymers of at least two members selected from the group consisting of acrylic acid esters and methacrylic acid esters with saturated alcohols having 1 to 8 carbon atoms, and copolymers of at least one member selected from the group consisting of acrylic acid esters and methacrylic acid esters with saturated alcohols having 1 to 8 carbon atoms with a member selected from the group consisting of vinyl chloride, vinyl acetate, acrylonitrile, styrene, and methacrylic acid.

7. A composition comprising an aqueous dispersion containing 10 to 60% by weight of a water-insoluble addition copolymer of 10 to 70% by weight of styrene and 90 to 30% by weight respectively of butadiene containing, as a thickener therefor, 0.1 to 2% by weight, on the weight of the water-insoluble copolymer, of a water-soluble salt of a copolymer of 35 to 56% by weight of methacrylic acid and 65 to 44% by weight of at least one ester of acrylic acid with a saturated alcohol having from 1 to 8 carbon atoms, at least 90% of the ester component consisting of at least one saturated alcohol having from 1 to 3 carbon atoms, said methacrylic acid copolymer having a molecular weight of at least 100,000.

8. A composition comprising an aqueous dispersion containing 10 to 60% by weight of a water-insoluble addition copolymer of 10 to 70% by weight of styrene and 90 to 30% by weight respectively of butadiene containing, as a thickener therefor, 0.1 to 2% by weight, on the weight of the water-insoluble copolymer, of a water-soluble salt of a copolymer of 59 to 47% by weight of ethyl acrylate and 41 to 53% by weight of methacrylic acid, said methacrylic acid copolymer having a molecular weight of at least 100,000.

References Cited in the file of this patent

UNITED STATES PATENTS

| 1,976,679 | Fikentscher et al. | Oct. 9, 1934 |
| 2,317,725 | Billig | Apr. 27, 1943 |
| 2,726,230 | Carlson | Dec. 6, 1955 |
| 2,807,597 | Sonnenfield et al. | Sept. 24, 1957 |

FOREIGN PATENTS

| 743,860 | Germany | Jan. 4, 1944 |

OTHER REFERENCES

Parker: "Official Digest," pages 700–709, October 1952.